UNITED STATES PATENT OFFICE.

WILHELM HIEMENZ, OF ELBERFELD, GERMANY, ASSIGNOR TO SYNTHETIC PATENTS CO. INC., OF NEW YORK, N. Y., A CORPORATION OF NEW YORK.

DERIVATIVES OF ACYLSALICYLIC-ACID COMPOUNDS.

1,122,201. Specification of Letters Patent. Patented Dec. 22, 1914.

No Drawing. Application filed September 3, 1914. Serial No. 860,015.

*To all whom it may concern:*

Be it known that I, WILHELM HIEMENZ, doctor of technical arts, chemist, citizen of the German Empire, residing at Elberfeld, Germany, have invented new and useful Improvements in New Derivatives of Acylsalicylic-Acid Compounds, of which the following is a specification.

I have found that the hitherto unknown acyl derivatives of oxyacylsalicylic acid compounds can be obtained by replacing the hydrogen of the oxy group in the salicylic acid compound by the radical of an aliphatic hydroxyacid in which the hydrogen of the hydroxy group is replaced by the radical of an aliphatic or aromatic carboxylic acid. The new products having most probably the following general formula:

RO— standing for the radical of a salicylic acid compound, such as

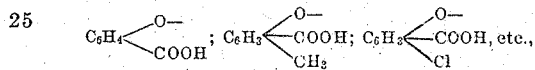

R' standing for a hydrocarbon radical, such as

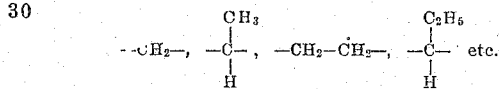

R'' standing for an organic radical, such as

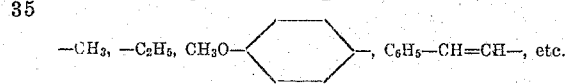

The new products are colorless crystals being split up by saponification with boiling alkalis; forming salts with alkalis or alkaline earths, the salts retaining the valuable therapeutic properties of the acids.

The new products have been proved to be excellent antipyretics and antineuralgics, an average single dose being about one gram. They possess the advantage over the known acylsalicylic acids of being less irritant and possessing an agreeable taste.

In order to illustrate the new process more fully the following example is given, the parts being by weight:—100 parts of acetylglycollylchlorid

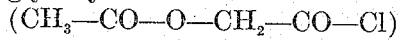

are added to a solution of 100 parts of salicylic acid and 100 parts of dimethylanilin in benzene at a temperature of 40–50° C. while the mixture is being stirred. The benzene solution is washed with dilute sulfuric acid and dried over sodium sulfate. Subsequently the benzene is distilled off *in vacuo* and the acetylglycollylsalicylic acid having most probably the formula:

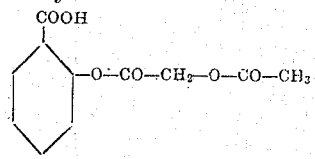

is crystallized from benzene. Colorless crystals melting at 103°C. Other of the above mentioned compounds are obtained in an analogous manner, *e. g.* acetylglycollyl-meta-cresotinic acid (melting point 108° C.), acetylglycollyl-para-cresotinic acid (melting point 151° C.), acetylglycollyl-chloro-salicylic acid (melting point 135° C.), acetylglycollyl-iodo-salicylic acid (melting point 144° C.), acetyllactyl-para-cresotinic acid (melting point 128° C.), cinnamoylglycollylsalicylic acid (melting point 135° C.), anisoylglycollylsalicylic acid (melting point 123° C.) etc.

I claim:—

1. The new acyl derivatives of oxyacylsalicylic acid compounds being colorless crystals, being split up by saponification with boiling alkalis, retaining in the form of their alkali metal and alkaline earth metal salts the valuable therapeutic properties of the free acids; having proved to be excellent antipyretics and antineuralgics, substantially as described.

2. The new acetylglycollyl-salicylic acid having most probably the formula:

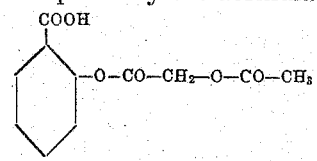

crystallizing from benzene in colorless crystals melting at 103° C.; being split up by saponification with boiling alkalis; retaining in the form of its alkali metal and alkaline earth metal salts the valuable therapeutic properties of the free acids; having proved to be an excellent antipyretic and antineuralgic, substantially as described.

In testimony whereof I have hereunto set my hand in the presence of two subscribing witnesses.

WILHELM HIEMENZ. [L. S.]

Witnesses:
  HELEN NUFER,
  ALBERT NUFER.